US009697581B2

United States Patent
Sakamoto

(10) Patent No.: US 9,697,581 B2
(45) Date of Patent: Jul. 4, 2017

(54) IMAGE PROCESSING APPARATUS AND IMAGE PROCESSING METHOD

(71) Applicant: YAHOO JAPAN CORPORATION, Tokyo (JP)

(72) Inventor: Ryuki Sakamoto, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 207 days.

(21) Appl. No.: 14/293,190

(22) Filed: Jun. 2, 2014

(65) Prior Publication Data

US 2014/0362099 A1 Dec. 11, 2014

(30) Foreign Application Priority Data

Jun. 10, 2013 (JP) .................................. 2013-121942

(51) Int. Cl.
| | |
|---|---|
| G09G 5/00 | (2006.01) |
| G06T 3/00 | (2006.01) |
| G06T 15/20 | (2011.01) |
| H04N 13/00 | (2006.01) |
| H04N 21/218 | (2011.01) |

(52) U.S. Cl.
CPC .......... *G06T 3/0062* (2013.01); *G06T 15/205* (2013.01); *H04N 13/0014* (2013.01); *H04N 21/21805* (2013.01)

(58) Field of Classification Search
CPC ....... G06F 2203/04806; G06F 3/04842; G06F 3/04815; G06F 3/04845; G06F 17/50; G06F 3/0346; G06F 3/04847; G06F 3/0488; G06T 1/0007; H04N 5/23293; H04N 19/172; H04N 5/23216; G06Q 10/20

See application file for complete search history.

(56) References Cited

U.S. PATENT DOCUMENTS

| | | | |
|---|---|---|---|
| 2004/0109032 A1* | 6/2004 | Kim ........................ | G06T 15/08 715/848 |
| 2006/0239525 A1* | 10/2006 | Katayama ............. | G06T 7/0044 382/128 |
| 2009/0316022 A1* | 12/2009 | Hatano .................. | H04N 1/401 348/240.99 |

(Continued)

FOREIGN PATENT DOCUMENTS

| | | |
|---|---|---|
| JP | 2006-115298 A | 4/2006 |
| JP | A-2009-258862 | 11/2009 |

OTHER PUBLICATIONS

May 12, 2015 Office Action issued in Japanese Application No. 2013-121942.

(Continued)

*Primary Examiner* — James A Thompson
*Assistant Examiner* — Xilin Guo
(74) *Attorney, Agent, or Firm* — Oliff PLC

(57) ABSTRACT

An image processing apparatus includes an image storage unit, a conversion unit, and an output unit. The image storage unit stores therein multiple images with different viewpoint positions. The conversion unit converts each of the images stored in the image storage unit to each of images to be imaged by imaging devices that are arranged such that respective optical axes pass through a dynamically set position in a target object. The output unit outputs the images converted by the conversion unit.

8 Claims, 11 Drawing Sheets

(56) References Cited

U.S. PATENT DOCUMENTS

2012/0287153 A1* 11/2012 Kashima ................ H04N 7/183
    345/629
2013/0155187 A1*  6/2013 Skyberg .......................... 348/46
2013/0155200 A1*  6/2013 Kakuko et al. ................ 348/49

OTHER PUBLICATIONS

Tomiyama et al., "Prototyping of HD Multi-Viewpoint Image Generating System," *IEICE Technical Report*, Dec. 2006, pp. 43-48 (with abstract).

* cited by examiner

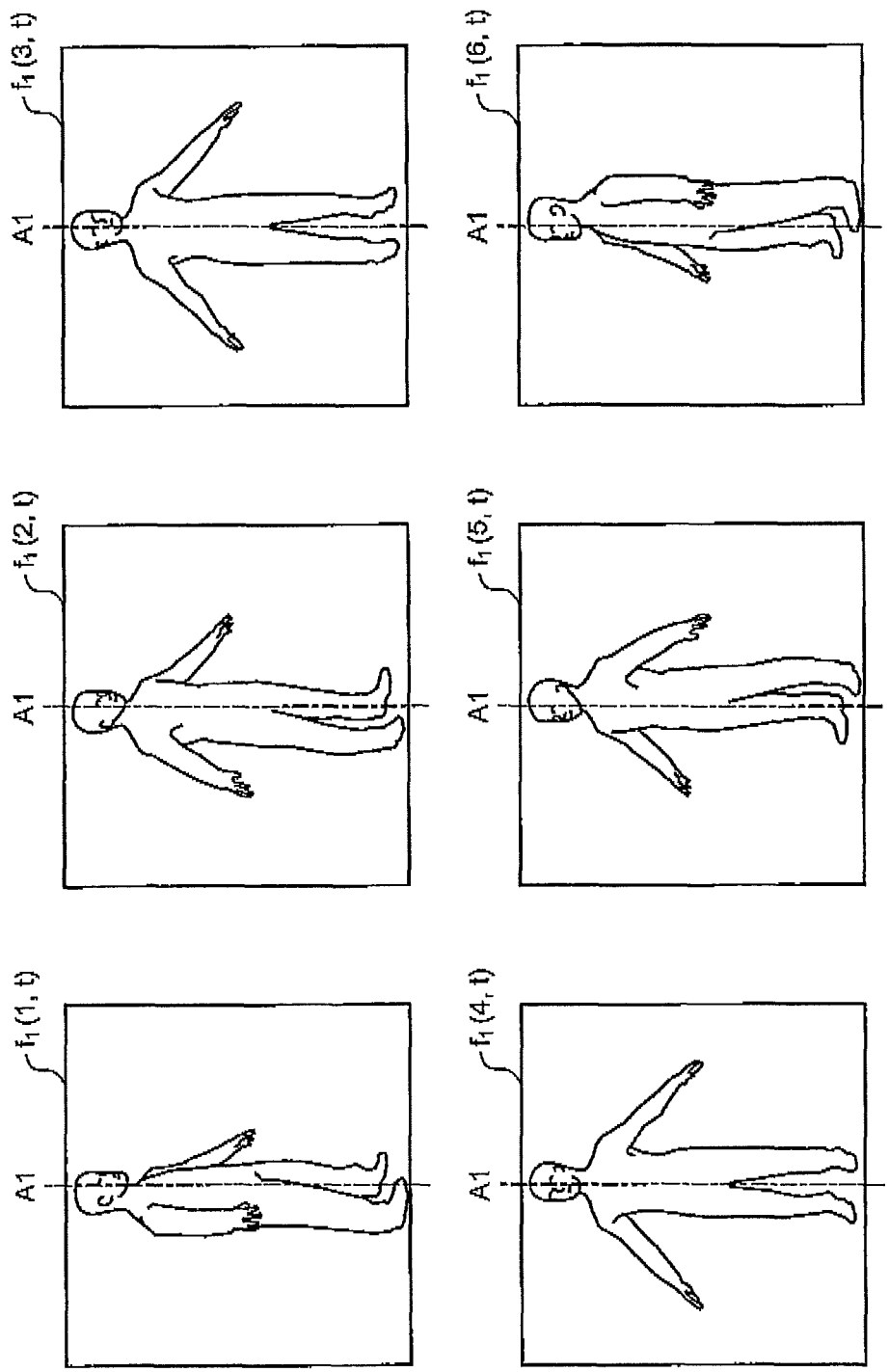

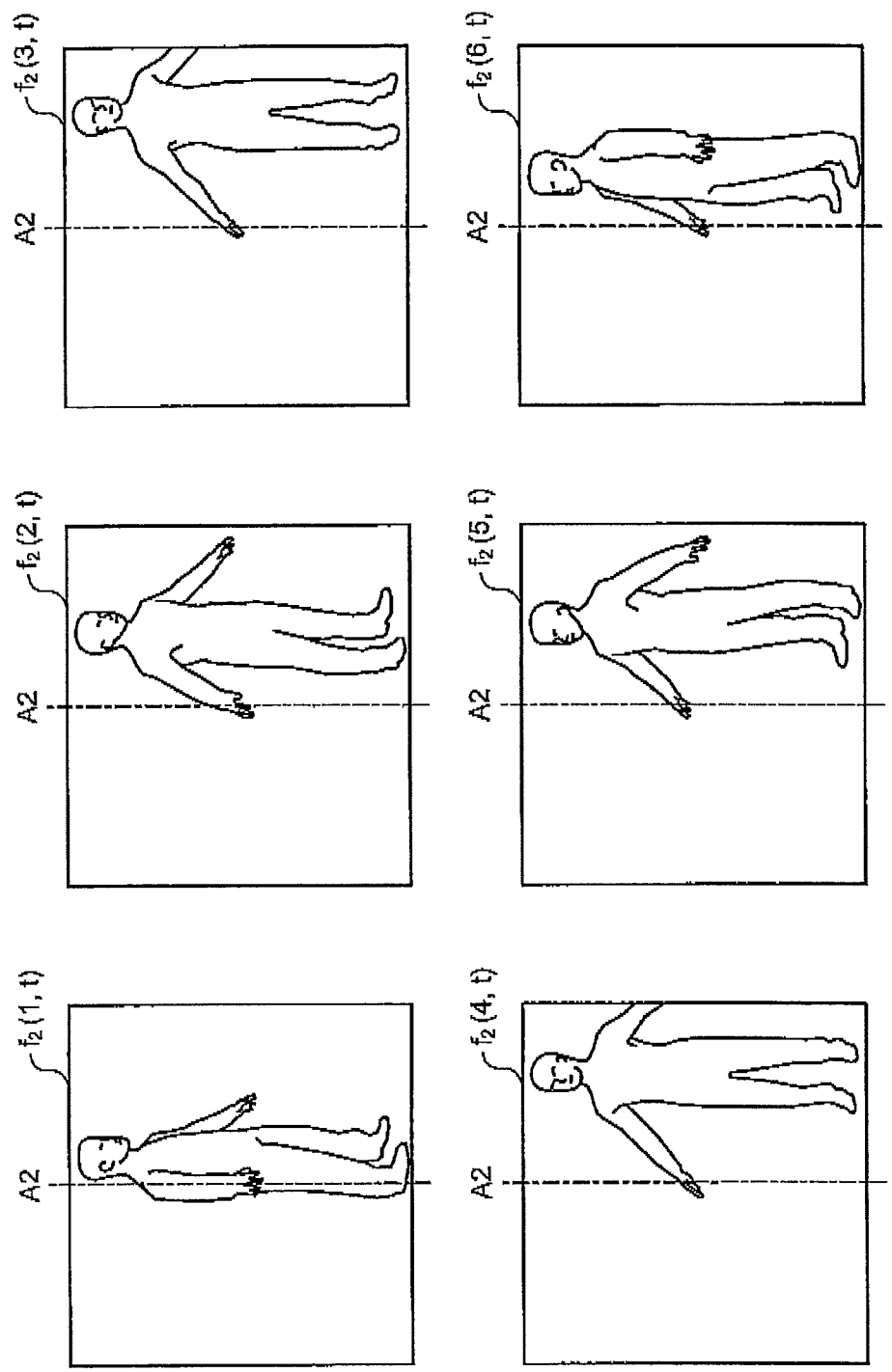

| CAMERA IDENTIFIER | VIDEO DATA | | | |
|---|---|---|---|---|
| | BEFORE CONVERSION | AFTER CONVERSION #1 | AFTER CONVERSION #2 | ... |
| C11 | $f_0(1, 1)$ TO $f_0(1, n)$ | $f_1(1, 1)$ TO $f_1(1, n)$ | $f_2(1, 1)$ TO $f_2(1, n)$ | ... |
| C12 | $f_0(2, 1)$ TO $f_0(2, n)$ | $f_1(2, 1)$ TO $f_1(2, n)$ | $f_2(2, 1)$ TO $f_2(2, n)$ | ... |
| C13 | $f_0(3, 1)$ TO $f_0(3, n)$ | $f_1(3, 1)$ TO $f_1(3, n)$ | $f_2(3, 1)$ TO $f_2(3, n)$ | ... |
| C14 | $f_0(4, 1)$ TO $f_0(4, n)$ | $f_1(4, 1)$ TO $f_1(4, n)$ | $f_2(4, 1)$ TO $f_2(4, n)$ | ... |
| C15 | $f_0(5, 1)$ TO $f_0(5, n)$ | $f_1(5, 1)$ TO $f_1(5, n)$ | $f_2(5, 1)$ TO $f_2(5, n)$ | ... |
| C16 | $f_0(6, 1)$ TO $f_0(6, n)$ | $f_1(6, 1)$ TO $f_1(6, n)$ | $f_2(6, 1)$ TO $f_2(6, n)$ | ... |
| ... | ... | ... | ... | ... |

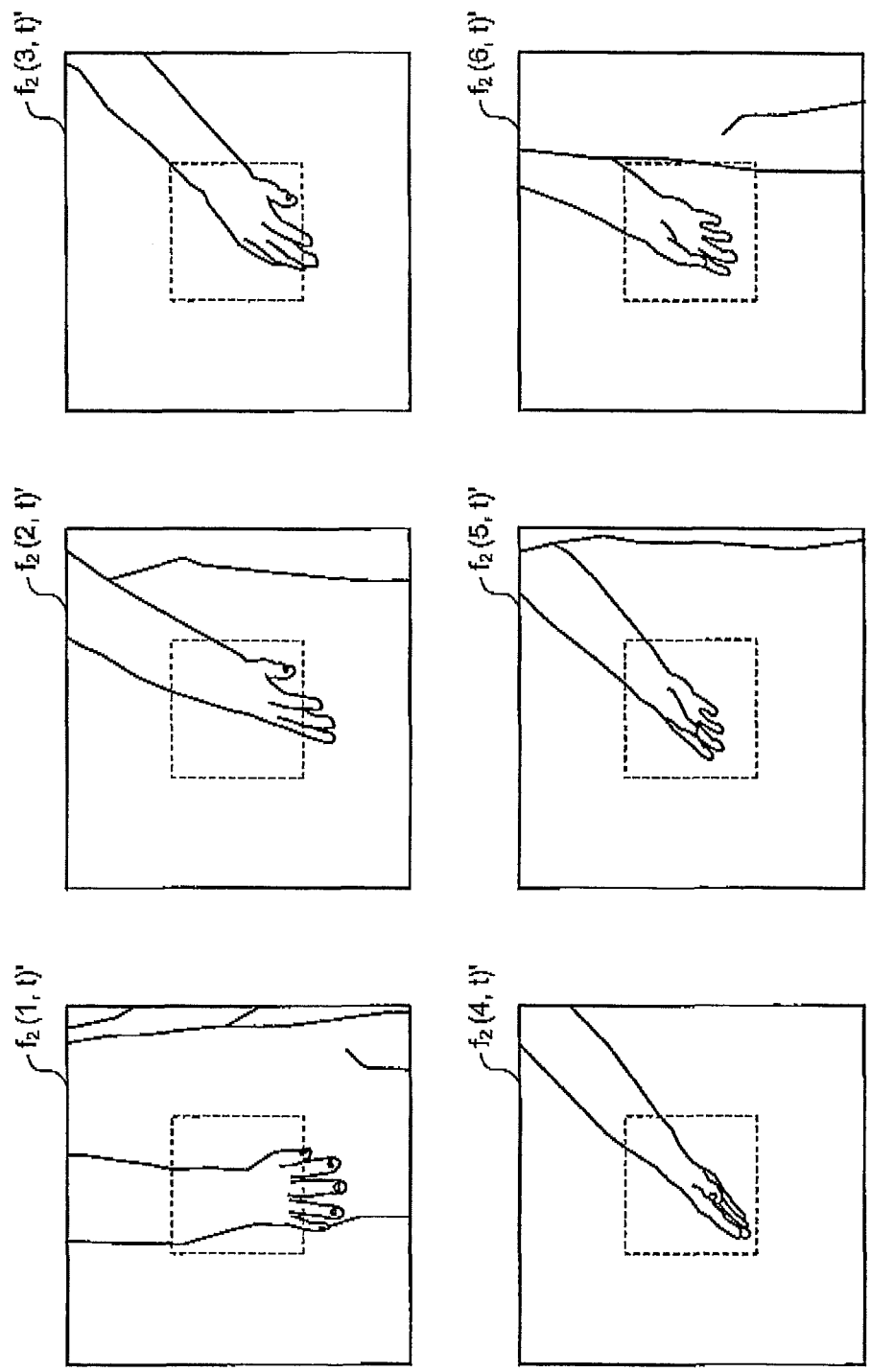

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2013-121942 filed in Japan on Jun. 10, 2013.

BACKGROUND OF THE INVENTION

1. Field of the Invention

The present invention relates to an image processing apparatus and an image processing method.

2. Description of the Related Art

Conventionally, an imaging technique (or a shooting technique, a camera technique) called time slice, bullet time, or the like is known. In the imaging technique, multiple imaging devices (for example, video cameras) are arranged around a target object (for example, an object such as a person). In this case, the multiple imaging devices are arranged such that optical axes of the respective imaging devices pass through a predetermined position in the target object. By sequentially displaying images imaged by the multiple imaging devices, it becomes possible to display video as if the video was imaged by an imaging device moving around the target object by using the passing position of the optical axes as the center. For example, when images imaged by the imaging devices at an arbitrary time are sequentially displayed, it becomes possible to express video as if the video was imaged by an imaging device moving around a target object while the time was stopped at this time. Such an imaging technique is used in, for example, movies, sports broadcasting, and the like. In the following, the above described passing position of the optical axes may be described as a "rotation center".

However, in the above described conventional imaging technique, it is difficult to display video by using an arbitrary position as the rotation center. Specifically, in the conventional imaging technique, it is only possible to display video by using a position designated at the time of imaging as the rotation center. Therefore, in the conventional imaging technique, to display video using an arbitrary position as the rotation center, imaging is performed a number of times by changing the passing position of the optical axes of the respective imaging devices. This is not practical because time and labor for the imaging increase. Therefore, in the conventional imaging technique, it is difficult to display video by using an arbitrary position as the rotation center.

SUMMARY OF THE INVENTION

It is an object of the present invention to at least partially solve the problems in the conventional technology.

According to one aspect of an embodiment, an image processing apparatus includes an image storage unit configured to store therein multiple images with different viewpoint positions; a conversion unit configured to convert each of the images stored in the image storage unit into each of images to be imaged by imaging devices that are arranged such that respective optical axes pass through a dynamically set position in a target object; and an output unit that outputs the images converted by the conversion unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2B is a diagram illustrating an example of the image processing performed by the image processing apparatus according to the embodiment;

FIG. 3B is a diagram illustrating an example of the image processing performed by the image processing apparatus according to the embodiment;

FIG. 11 is a diagram illustrating an example of an enlarged image according to the modification.

DETAILED DESCRIPTION OF THE PREFERRED EMBODIMENTS

Figure 1:
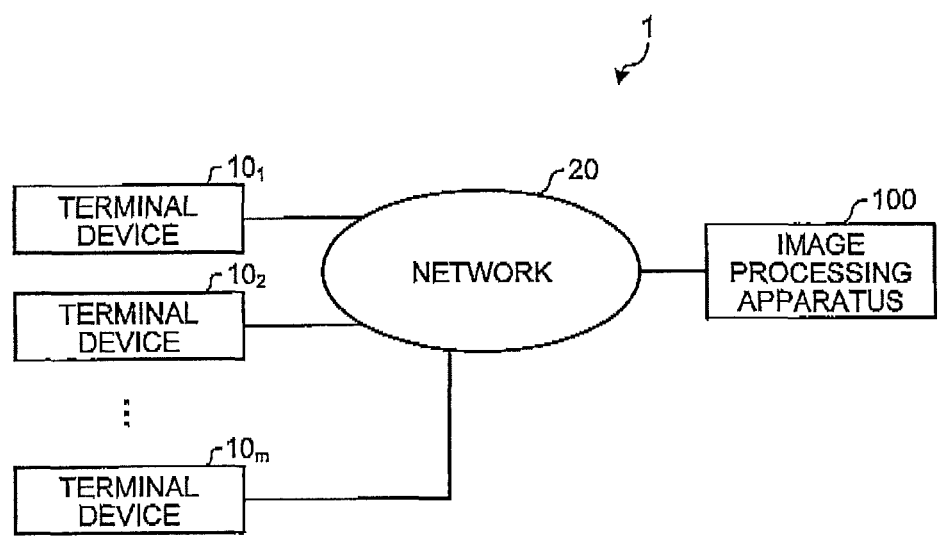
FIG. 1 is a diagram illustrating a configuration example of an image processing system according to an embodiment.

Preferred embodiments of an image processing apparatus, an image processing method, and an image processing program according to the present application will be described in detail based on drawings. The image processing apparatus, the image processing method, and the image processing program according to the present application are not limited by the embodiments. In each of the embodiments below, the same components are denoted by the same reference numerals and symbols, and the same explanation will be omitted.

1. Configuration of Image Processing System

An image processing system according to an embodiment will be described with reference to FIG. 1. FIG. 1 is a diagram illustrating a configuration example of the image processing system according to the embodiment. As illustrated in FIG. 1, an image processing system 1 according to the embodiment includes terminal devices $10_1$ to $10_m$ and an image processing apparatus 100. The terminal devices $10_1$ to $10_m$ and the image processing apparatus 100 are communicably connected to one another via a network 20.

The terminal devices $10_1$ to $10_m$ are information processing apparatuses used by users who view video data provided by the image processing apparatus 100. For example, the terminal devices $10_1$ to $10_m$ may be mobile phones, personal digital assistances (PDAs), or personal computers (PCs). In the following, the terminal devices $10_1$ to $10_m$ may collectively be described as the "terminal device 10" when they need not be distinguished from one another.

The image processing apparatus 100 is a server device that distributes video data to the terminal device 10. For example, the image processing apparatus 100 distributes video data generated by an imaging technique called time slice, bullet time, or the like.

2. Image Processing

An example of image processing performed by the image processing apparatus 100 according to the embodiment will be described with reference to FIG. 2A, FIG. 2B, FIG. 3A, and FIG. 3B. In the example in FIG. 2A and FIG. 3A, an object P is viewed from above.

Figure 2A:
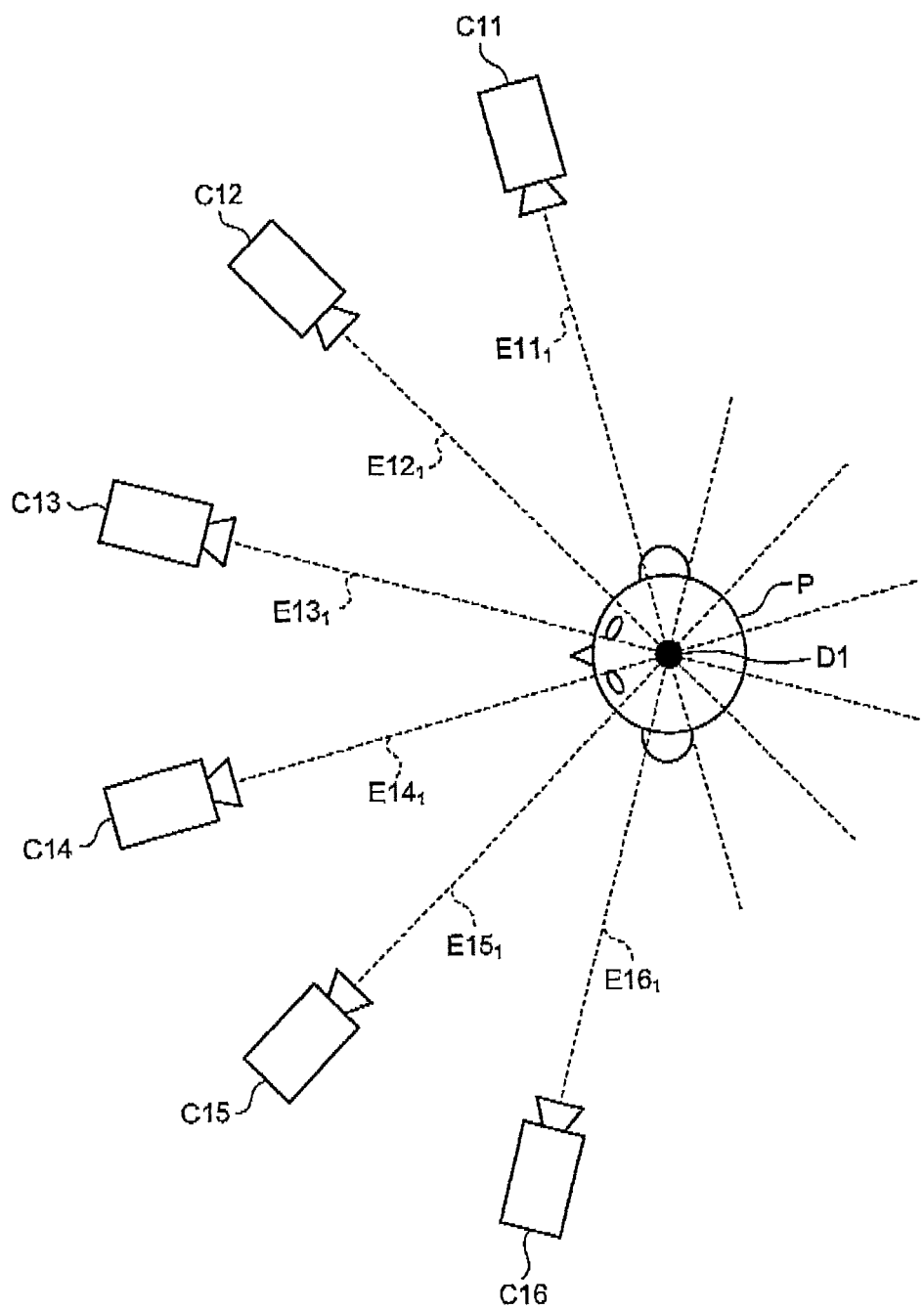
FIG. 2A is a diagram illustrating an example of image processing performed by an image processing apparatus according to the embodiment.

In FIG. 2A, imaging devices C11 to C16 are, for example, video cameras. Furthermore, the imaging devices C11 to C16 are arranged around an object P as a target object such that optical axes of the respective imaging devices pass through a predetermined position. In the example in FIG. 2A, the imaging device C11 is arranged such that an optical axis $E11_1$ passes through a three-dimensional position D1 corresponding to the center of the object P. Furthermore, the imaging devices C12 to C16 are arranged such that respective optical axes $E12_1$ to $E16_1$ pass through the three-dimensional position D1. The imaging devices C11 to C16 are set such that at least bases of projection planes become approximately parallel to the ground. The imaging devices C11 to C16 simultaneously capture images of the object P in the state as illustrated in FIG. 1, and generate pieces of video data of the object P.

The image processing apparatus 100 stores the pieces of the video data generated by the imaging devices C11 to C16 illustrated in FIG. 2A. The image processing apparatus 100 generates video data with an effect called time slice, bullet time, or the like by using the pieces of the video data, and distributes the generated video data to the terminal device 10.

For example, the image processing apparatus 100 generates video data in which display target images are changed in the order of arrangement of the imaging devices C11 to C16 at predetermined time intervals. The display target images described herein are frames contained in each of the piece of the video data generated by the imaging devices C11 to C16. Furthermore, the order of arrangement of the imaging devices C11 to C16 is, for example, an order of the imaging devices C11, C12, C13, C14, C15, and C16, the reverse order of the above, or the like. Therefore, the image processing apparatus 100 can express video as if the video was imaged by an imaging device moving around the object P.

Furthermore, not being limited to the above example, the image processing apparatus 100 generates, for example, video data containing shot (scene) in which the frames imaged by the imaging devices C11 to C16 at the same time are displayed in the order of arrangement of the imaging devices. Therefore, the image processing apparatus 100 can express video as if the video was imaged by an imaging device moving around the object P while the time is stopped.

An example of video data distributed by the image processing apparatus 100 will be described with reference to FIG. 2B. FIG. 23 illustrates frames generated by the imaging devices C11 to C16 at an arbitrary time t. Specifically, a frame $f_1(1, t)$ is generated by the imaging device C11, a frame $f_1(2, t)$ is generated by the imaging device C12, and a frame $f_1(6, t)$ is generated by the imaging device C16. In reality, the frame $f_1(1, t)$ and the like are not the same frames as those generated by the imaging devices, but are frames obtained through a pre-conversion process to be described later. Hereinafter, it is assumed that the frame $f_1(1, t)$ and the like are generated by the imaging devices, and the pre-conversion process will be described in detail later.

The image processing apparatus 100 distributes, to the . . . terminal device 10, video data in which the frames $f_1(1, t)$, $f_1(2, t)$, $f_1(3, t)$, $f_1(4, t)$ $f_1(5, t)$, and $f_1(6, t)$ illustrated in FIG. 2B are displayed in this order for example. Therefore, the image processing apparatus 100 can express video as if the video was imaged by an imaging device moving around a rotation center A1. Hereinafter, it is assumed that the imaging devices C11 to C16 are arranged so as to be approximately parallel to the ground. Therefore, the rotation center A1 corresponds to a straight line that extends approximately vertically from a position corresponding to the three-dimensional position D1 illustrated in FIG. 2A toward the ground.

The image processing apparatus 100 according to the embodiment generates, by using the pieces of the video data generated by the imaging devices C11 to C16, video data in which a dynamically set three-dimensional position in a target object is used as a rotation center. This will be simply described with reference to FIG. 3A and FIG. 3B. In this example, it is assumed that the image processing apparatus 100 generates video data by using a three-dimensional position D2 illustrated in FIG. 3A as a rotation center. In this case, the image processing apparatus 100 converts the pieces of the video data generated by the imaging devices C11 to C16 illustrated in FIG. 2A into pieces of video data generated by the imaging devices C11 to C16 arranged as in the example illustrated in FIG. 3A.

Figure 3A:
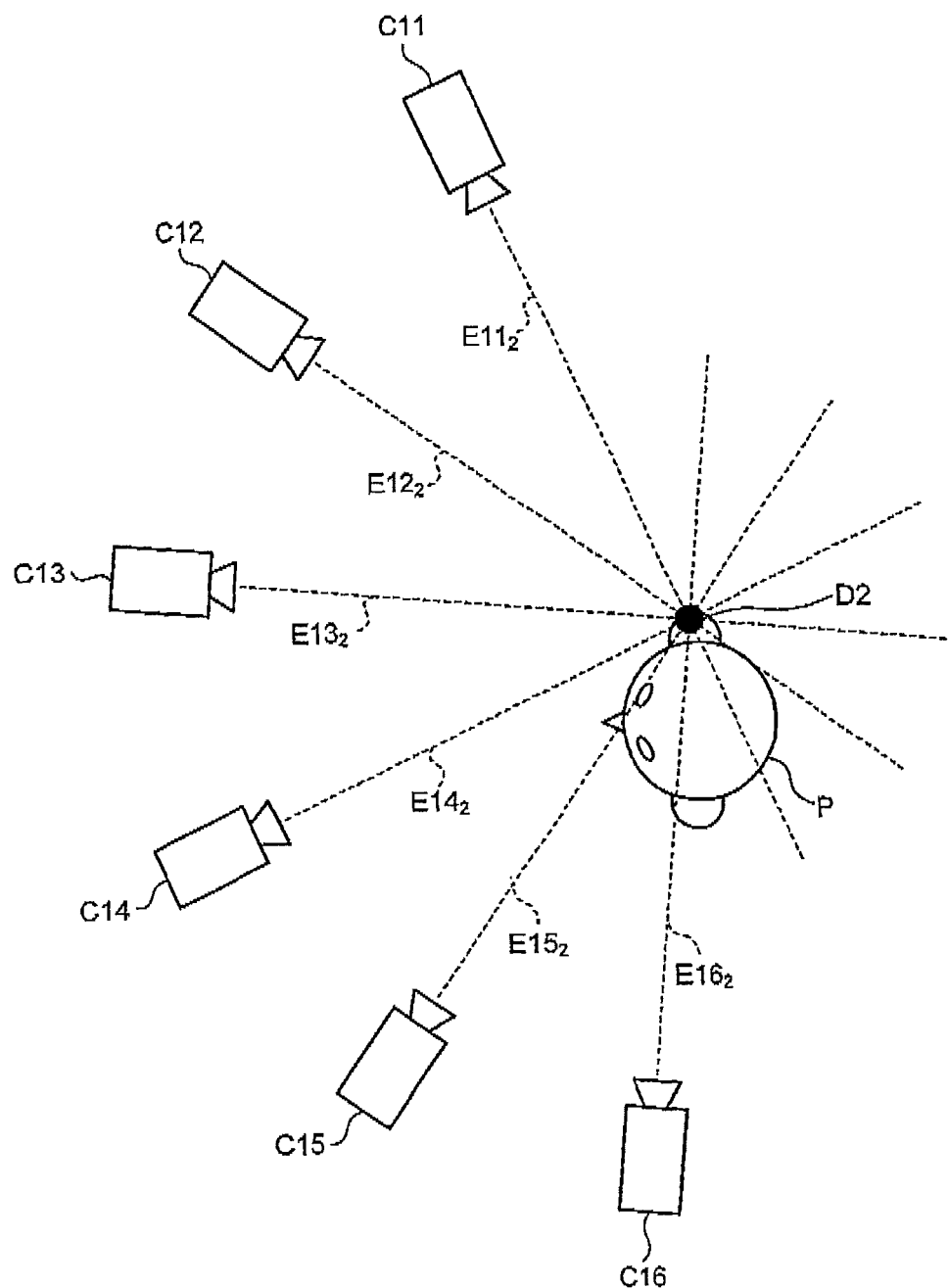
FIG. 3A is a diagram illustrating an example of the image processing performed by the image processing apparatus according to the embodiment.

Specifically, in the example in FIG. 3R, the imaging devices C11 to C16 are arranged such that respective optical axes $E11_2$ to $E16_2$ pass through the three-dimensional position D2 corresponding to the right side of the object P. The image processing apparatus 100 according to the embodiment assumes that the imaging devices C11 to C16 are arranged as in the example illustrated in FIG. 3A. The image processing apparatus 100 converts each of frames in the pieces of the video data generated by the imaging devices C11 to C16 in FIG. 2A into each of frames expected to be generated by the imaging devices C11 to C16 arranged as in the example in FIG. 3A.

FIG. 3B illustrates an example of frames converted by the image processing apparatus 100. In the example in FIG. 3B, the image processing apparatus 100 converts the frame $f_1(1, t)$ illustrated in FIG. 2B into a frame $f_2(1, t)$ to be imaged by the imaging device C11 when the imaging device is arranged as in the example illustrated in FIG. 3A. Similarly, the image processing apparatus 100 converts the frame $f_1(2, t)$ into a frame $f_2(2, t)$, converts the frame $f_1(3, t)$ into a frame $f_2(3, t)$, converts the frame $f_1(4, t)$ into a frame $f_2(4, t)$, converts the frame $f_1(5, t)$ into a frame $f_2(5, t)$, and converts the frame $f_1(6, t)$ into a frame $f_2(6, t)$. Such a frame conversion process will be described later.

Subsequently, the image processing apparatus 100 generates video data in which, for example, the converted frames $f_2(1, t)$, $f_2(2, t)$, $f_2(3, t)$, $f_2(4, t)$, $f_2(5, t)$, and $f_2(6, t)$ are displayed in this order, and distributes the generated video data to the terminal device 10. Therefore, the image processing apparatus 100 can display, on the terminal device 10, video as if the video was imaged by an imaging device moving around the rotation center A2 corresponding to the three-dimensional position D2 illustrated in FIG. 3A. Namely, the image processing apparatus 100 can display video using an arbitrary position as the rotation center by performing the frame conversion process as described above, without performing imaging a number of times while changing the intersection of the optical axes of the imaging devices C11 to C16.

In the above described example, the six imaging devices C11 to C16 are used to capture images of the object P; however, the number of the imaging devices is not limited to this example. Furthermore, the arrangement positions of the imaging devices C11 to C16 are not limited to those illustrated in FIG. 2A and FIG. 3A. For example, it may be possible to arrange multiple imaging devices around the object P at regular intervals on the circumference of a circle.

3. Configuration of Image Processing Apparatus

Figures 4, 5:
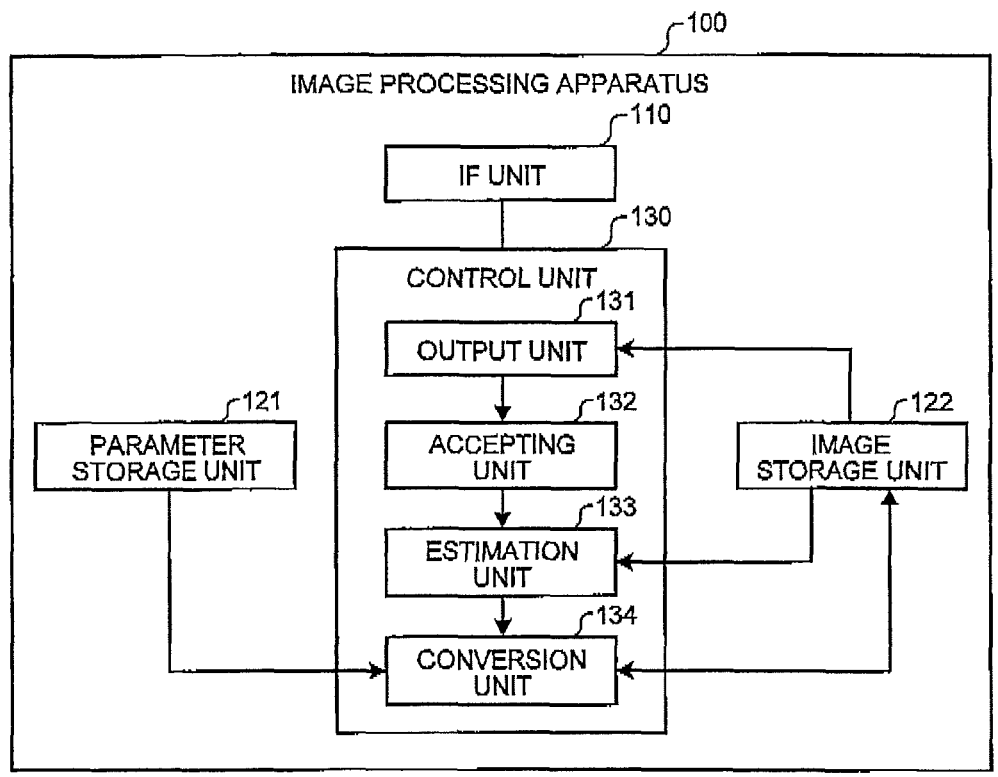
FIG. 4 is a diagram illustrating a configuration example of the image processing apparatus according to the embodiment.
FIG. 5 is a diagram illustrating an example of an image storage unit according to the embodiment.

A configuration of the above described image processing apparatus 100 will be described with reference to FIG. 4. FIG. 4 is a diagram illustrating a configuration example of the image processing apparatus 100 according to the embodiment. In the following, it is assumed that the imaging devices C11 to C16 illustrated in FIG. 2A capture images of the object P.

As illustrated in FIG. 4, the image processing apparatus 100 includes an IF (interface) unit 110, a parameter storage unit 121, an image storage unit 122, and a control unit 130. The image processing apparatus 100 may include an input unit (for example, a keyboard, a mouse, or the like) that accepts various types of operation from an administrator or the like of the image processing apparatus 100, or a display unit (for example, a liquid crystal display or the like) that displays various types of information.

IF Unit 110

The IF unit 110 transmits and receives various types of data to and from the terminal device 10 via the network 20. For example, the IF unit 110 is realized by a network interface card (NIC) or the like.

Parameter Storage Unit 121

The parameter storage unit 121 stores therein various camera parameters related to the imaging devices C11 to C16. For example, the parameter storage unit 121 stores, for each of the imaging devices, a focal distance of the imaging device, aspect ratio and skew of images generated by the imaging device, and the like as the camera parameters. The camera parameters of each of the imaging devices are acquired by performing calibration on each of the imaging devices C11 to C16 in advance.

Image Storage Unit 122

The image storage unit 122 stores multiple images with different viewpoint positions. Specifically, the image storage unit 122 stores therein images of a target object imaged by the imaging devices C11 to C16 arranged in different positions. The image storage unit 122 according to the embodiment stores, as the images of the target object, each of frames of the pieces of the video data generated by the imaging devices C11 to C16.

FIG. 5 illustrates an example of the image storage unit 122 according to the embodiment. As illustrated in FIG. 5, the image storage unit 122 contains items of "camera identifier", "video data", and the like. The "camera identifier" indicates identification information for identifying each of the imaging devices C11 to C16. In the example in FIG. 5, reference symbols "C11" to "C16" assigned to the imaging devices C11 to C16 are the "camera identifiers".

The "video data" indicates video data generated by each of the imaging devices C11 to C16. Specifically, frames of the video data are stored in the "video data". Furthermore, as illustrated in FIG. 5, the "video data" is divided into items such as "before conversion", "after conversion #1", and "after conversion #2". In the "before conversion", pieces of video data generated by the imaging devices C11 to C16 are stored. In the "after conversion #1" and the "after conversion #2", pieces of video data generated through a conversion process performed by a conversion unit 134 to be described later are stored. While the "after conversion #1" and the "after conversion #2" are illustrated in FIG. 5, the image storage unit 122 may stare therein pieces of video data corresponding to "after conversion #3" and subsequent conversions.

For example, in FIG. 5, an example is illustrated in which the image storage unit 122 stores therein frames $f_0(1, 1)$ to $f_0(1, n)$ generated by the imaging device C11, frames $f_1(1, 1)$ to $f_1(1, n)$ converted from the frames $f_0(1, 1)$ to $f_0(1, n)$, and frames $f_2(1, 1)$ to $f_2(1, n)$ converted from the frames $f_1(1, 1)$ to $f_1(1, n)$. In $f(C, t)$ representing a frame, "C" corresponds to a value of the last digit of the camera identifier, and "t" indicates the order or an imaging time of the frame in the video data. Specifically, $f(1, 1)$ indicates a frame that is generated by the imaging device C11 and that is firstly displayed.

The parameter storage unit 121 and the image storage unit 122 as described above are realized by, for example, semiconductor memory devices such as random access memories (RAMs) or flash memories, or hard disks, optical disks, or the like.

Control Unit 130

The control unit 130 is realized by causing, for example, a central processing unit (CPU), a micro processing unit (MPU), or the like to execute various programs (corresponding to an example of an image processing program) stored in a storage device in the image processing apparatus 100 by using a RAM as a work area. Furthermore, the control unit 130 is realized by, for example, an integrated circuit such as an application specific integrated circuit (ASIC) or a field programmable gate array (FPGA).

The control unit 130 includes, as illustrated in FIG. 4, an output unit 131, an accepting unit 132, an estimation unit 133, and the conversion unit 134, and realizes or implements information processing functions and operation as described below. The internal configuration of the control unit 130 is not limited to the configuration illustrated in FIG. 4, and other configurations may be employed as long as information processing as will be described later is performed. Furthermore, a connection relation between the processing units of the control unit 130 is not limited to the connection relation as illustrated in FIG. 4, and other connection relations may be employed.

Preprocessing by Conversion Unit 134

Before an explanation of a process performed by the control unit 130, frames generated by the imaging devices C11 to C16 will be described. In FIG. 2A, the example is described in which the imaging devices C11 to C16 are arranged such that the optical axes $E11_1$ to $E16_1$ pass through the three-dimensional position D1. However, in reality, it is difficult to accurately arrange the imaging devices C11 to C16 such that the respective optical axes pass through the three-dimensional position D1. Therefore, the image processing apparatus 100 according to the embodiment performs a "pre-conversion process" to convert each of the frames generated by the imaging devices C11 to C16 into each of frames expected to be generated by the imaging devices C11 to C16 arranged such that the optical axes pass through the three-dimensional position D1. The pre-conversion process is performed by the conversion unit 134 when, for example, the frames generated by the imaging devices C11 to C16 are stored in the "before conversion" in the image storage unit 122.

The pre-conversion process performed by the conversion unit 134 will be described in detail below. The conversion unit 134 performs a frame conversion process by using a 3×3 projective transformation matrix $H_i$ that differs for each of the imaging devices. The projective transformation matrix $H_i$ can be calculated based on the camera parameters of the imaging devices C11 to C16 stored in the parameter storage unit 121. In the example in FIG. 2A, the projective transformation matrix $H_i$ can be calculated based on at least the camera parameters, the three-dimensional position D1 serving as the rotation center, and a two-dimensional position c obtained by back-projection of the three-dimensional position D1 on the converted frame. A technique related to such a frame conversion process is described in the literature below (Non Patent Literature 1 described earlier).

(Reference Literature) "Prototyping of HD Multi-Viewpoint Image Generating System", Kimihiro TOMIYAMA, Isao MIYAGAWA, Yuichi IWADATE For example, in the example in FIG. 5, the conversion unit 134 converts the frames $f_0(1, 1)$ to $f_0(1, n)$ generated by the imaging device C11 into the frames $f_1(1, 1)$ to $f_1(1, n)$ by using the projective transformation matrix $H_1$ calculated from the camera parameters of the imaging device C11. The conversion unit 134 stores the converted frames $f_1(1, 1)$ to $f_1(1, n)$ in the image storage unit 122 in association with the camera identifier "C11" and the "after conversion #1". Similarly, the conversion unit 134 converts the frames generated by the imaging devices C12 to C16, and stores the converted frames in the "after conversion #1" in the image storage unit 122.

Output Unit 131

The output unit 131 outputs video data stored in the image storage unit 122 to the terminal device 10. Specifically, upon receiving a video data acquisition request from the terminal device 10, the output unit 131 distributes video data corresponding to the acquisition request to the terminal device 10 via the IF unit 110. Incidentally, the output unit 131 does not distribute frames corresponding to the "before conversion" stored in the image storage unit 122, but distributes video data generated from the frames corresponding to the "after conversion #1" or the "after conversion #2". For example, before a user performs operation of changing the rotation center, the output unit 131 distributes video data generated form the frames corresponding to the "after conversion #1" to the terminal device 10. When the user performs the operation of changing the rotation center, frames converted by the conversion unit 134 to be described later are stored in the "after conversion #2". In this case, the output unit 131 distributes video data generated from the frames corresponding to the "after conversion #2" to the terminal device 10.

Accepting Unit 132

The accepting unit 132 accepts various types of operation on video data from a user of the terminal device 10. For example, the accepting unit 132 accepts operation of designating, as a new rotation center of video data, a position in an arbitrary frame contained in the video data.

An example of a process performed by the accepting unit 132 according to the embodiment will be described with reference to FIG. 6. In the example in FIG. 6, it is assumed that the output unit 131 of the image processing apparatus 100 has distributed the video data generated from the frames corresponding to after conversion #1 to the terminal device 10. The terminal device 10 displays the video data distributed from the image processing apparatus 100 on a display unit. The terminal device 10 according to the embodiment accepts operation of designating a new rotation center of video from a user while the video is being displayed. In the example in FIG. 6, the terminal device 10 accepts operation of designating a two-dimensional position $m_{4t}$ in the frame $f_1(4, t)$ while displaying the frame $f_1(4, t)$. In this case, the terminal device 10 transmits information for identifying the frame $f_1(4, t)$ on which the user operation is performed and information on the designated two-dimensional position $m_{4t}$ (for example, the coordinate) to the image processing apparatus 100. The accepting unit 132 of the image processing apparatus 100 accepts the identification information on the frame and the information on the designated position transmitted from the terminal device 10 as described above.

Estimation Unit 133

The estimation unit 133 estimates a three-dimensional position of a target object corresponding to the two-dimensional position accepted by the accepting unit 132. More specifically, the above described accepting unit 132 accepts, as a new rotation center of video data, a two-dimensional position with respect to an arbitrary frame contained in the video data. As described above, when a frame fy using a new rotation center is to be generated from an arbitrary frame fx, a projective transformation matrix corresponding to an imaging device that has generated the frame fx is used. The projective transformation matrix uses at least pieces of information on the camera parameters of the imaging device that has generated the frame fx, a three-dimensional position in a target object to be a new rotation center, and a two-dimensional position on the frame fy obtained by back-projection of the three-dimensional position serving as the new rotation center on the frame fy. Among these pieces of the information, the camera parameters of the imaging device are stored in the parameter storage unit 121. The two-dimensional position on the frame fy serving as the new rotation center corresponds to the two-dimensional position accepted by the accepting unit 132. Therefore, if the three-dimensional position of the target object to be the new rotation center can be obtained, it becomes possible to generate the frame fy using the new rotation center from the arbitrary frame fx. Therefore, the estimation unit 133 according to the embodiment estimates the three-dimensional position of the target object corresponding to the two-dimensional position, based on the two-dimensional position on the frame accepted by the accepting unit 132.

An example of the estimation process performed by the estimation unit 133 will be described. Hereinafter, it is assumed that the rotation center of the frames stored in the "after conversion #1" in the image storage unit 122 is the three-dimensional position D1 illustrated in FIG. 2A. Furthermore, it is assumed that, as in the example in FIG. 6, the accepting unit 132 has accepted the operation of designating the two-dimensional position $m_{4t}$ as the new rotation center with respect to the frame $f_1(4, t)$ contained in the video data in the "after conversion #1". Moreover, a three-dimensional position indicating the new rotation center to be estimated is denoted by D1'.

Figure 7:
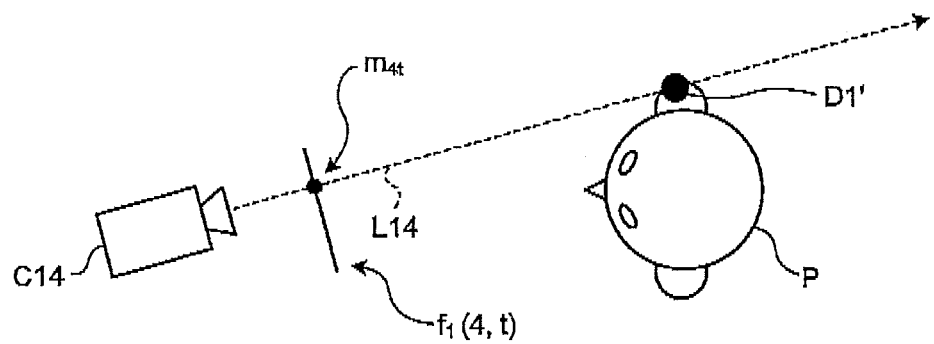
FIG. 7 is a diagram illustrating an example of an estimation process performed by an estimation unit according to the embodiment.

In this example, the three-dimensional position D1' corresponds to a position at which a straight line extending from an optical center of the imaging device C14 that has generated the frame $f_1(4, t)$ to the two-dimensional position $m_{4t}$ on the projection plane of the imaging device C14 first intersects with the target object. This will be described with reference to FIG. 7. As illustrated in FIG. 7, the three-dimensional position D1' indicating the new rotation center corresponds to a position at which a straight line L14 extending from the optical center of the imaging device C14 to the two-dimensional position $m_{4t}$ on the frame $f_1(4, t)$ being the projection plane first intersects with the target object. This is because the position designated by the user with respect to the frame $f_1(4, t)$ is a position that the user can view. Namely, the estimation unit 133 only has to estimate the three-dimensional position D1' of the target object appearing in the two-dimensional position $m_{4t}$.

Therefore, the estimation unit 133 estimates a depth of each feature point drawn in each frame, from the frames (for example, the frames $f_1(1, t)$, $f_1(2, t)$, $f_1(3, t)$, $f_1(4, t)$, $f_1(5, t)$, $f_1(6, t)$, and the like) corresponding to the imaging devices C11 to C16 stored in the image storage unit 122 based on a multi-baseline stereo method for example. Accordingly, the estimation unit 133 can estimate a three-dimensional shape of the target object. The estimation unit 133 estimates, as the three-dimensional position D1', the position of a feature point with which the straight line L14 first intersects, based on a result of estimation of the depth and the above described straight line L14.

The estimation process performed by the estimation unit 133 is not limited to the above described example. For example, the estimation unit 133 specifies a two-dimensional position $m_{xt}$ on another frame corresponding to the two-dimensional position $m_{4t}$ on the frame $f_1(4, t)$. The estimation unit 133 estimates the three-dimensional position D1' from the two-dimensional positions $m_{4t}$ and $m_{xt}$ based on the principle of triangulation. This estimation process will be described with reference to FIG. 8.

Figure 8:
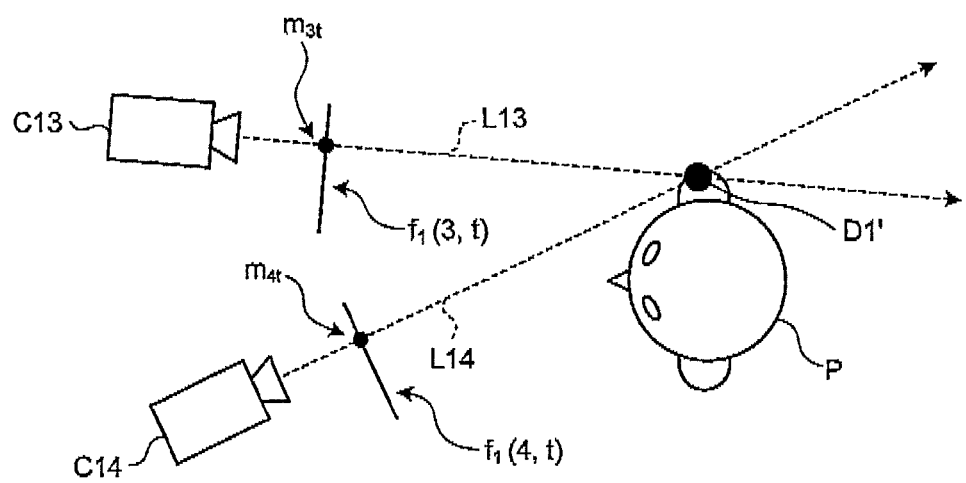
FIG. 8 is a diagram illustrating an example of the estimation process perforated by the estimation unit according to the embodiment.

In the example in FIG. 8, the estimation unit 133 first specifies a two-dimensional position $m_{3t}$ on the frame $f_1(3, t)$ corresponding to the two-dimensional position $m_{4t}$ on the frame $f_1(4, t)$. For example, the estimation unit 133 acquires a feature amount (or a feature vector) of a predetermined region in the frame $f_1(4, t)$ in which the two-dimensional position $m_{4t}$ is used as the center, and searches for a region in the frame $f_1(3, t)$ corresponding to the acquired feature amount. Subsequently, the estimation unit 133 specifies the center position of the searched region in the frame $f_1(3, t)$ as the two-dimensional position $m_{4t}$. Thereafter, the estimation unit 133 estimates, as the three-dimensional position D1', an intersection of the straight line L14 extending from the optical axis of the imaging device C14 to the two-dimensional position $m_{4t}$ and a straight line L13 extending from the optical axis of the imaging device C13 to the two-dimensional position $m_{3t}$.

In the example in FIG. 8, the estimation unit 133 may specify the two-dimensional position $m_{3t}$ through a process as described below. Specifically, the estimation unit 133 extracts a "k×k" rectangular region $t_{4t}$ in the frame $f_1(4, t)$ in which the two-dimensional position $m_{4t}$ is used as the center, and stores the extracted rectangular region $t_{4t}$ as a template in a memory unit such as a memory. Subsequently, the estimation unit 133 acquires an epipolar line on the frame $f_1(3, t)$ corresponding to the two-dimensional position $m_{4t}$ on the frame $f_1(4, t)$, and extracts an arbitrary "k×k" rectangular region $t_{4t}$ located on the epipolar line. Thereafter, the estimation unit 133 calculates a sum of squared difference (SSD) of the extracted rectangular region $t_{3t}$ and the rectangular region $t_{4t}$ stored in the memory as described above, and specifies, as the two-dimensional position $m_{3t}$, the center position of the rectangular region $t_{3t}$ corresponding to the smallest calculated SSD.

While an example is described in FIG. 8 in which the three-dimensional position D1' is estimated by using the frames generated by the imaging device C1, the estimation unit 133 may estimate the three-dimensional position D1' by using the frames generated by the imaging device C11, C12, C15, C16, or the like.

Conversion Unit 134

The conversion unit 134 converts the video data stored in the image storage unit 122 into video data to be generated by the imaging devices C11 to C16 when the imaging devices are arranged such that the optical axes pass through the three-dimensional position estimated by the estimation unit 133. In the examples in FIG. 6 to FIG. 8, the conversion unit 134 calculates projective transformation matrixes $H_1$ to $H_6$ corresponding to the imaging devices C11 to C16 by using the camera parameters of the respective imaging devices stored in the parameter storage unit 121, the two-dimensional position $m_{4t}$ on the frame accepted by the accepting unit 132, and the three-dimensional position D1' estimated by the estimation unit 133. The conversion unit 134 converts the video data stored in the image storage unit 122 by using the projective transformation matrix $H_1$ to $H_6$, and stores the converted video data in the image storage unit 122.

For example, it is assumed that video data corresponding to the "after conversion #1" is distributed to the terminal device 10 among pieces of video data stored in the image storage unit 122. It is also assumed that the three-dimensional position D1' estimated by the estimation unit 133 corresponds to the three-dimensional position D2 illustrated in FIG. 3a. In this case, the conversion unit 134 converts the frames $f_1(1, t)$, $f_1(2, t)$, $f_1(5, t)$, $f_1(4, t)$, $f_1(5, t)$, and $f_1(6, t)$ corresponding to a time t into the frames $f_2(1, t)$, $f_2(2, t)$, $f_2(3, t)$, $f_2(4, t)$, $f_2(5, t)$, and $f_2(6, t)$ illustrated in FIG. 3B. Subsequently, the conversion unit 134 performs the same conversion process on all of the frames of the video data corresponding to the "after conversion #1", and stores the converted frames in the "after conversion #2" in the image storage unit 122.

Thereafter, the output unit 131 distributes the frames converted by the conversion unit 134 to the terminal device 10. For example, the output unit 131 generates video data in which frames are sequentially displayed in the same order as in the video data obtained before conversion, and distributes the generated video data to the terminal device 10.

4. Flow of Image Processing

Figure 9:
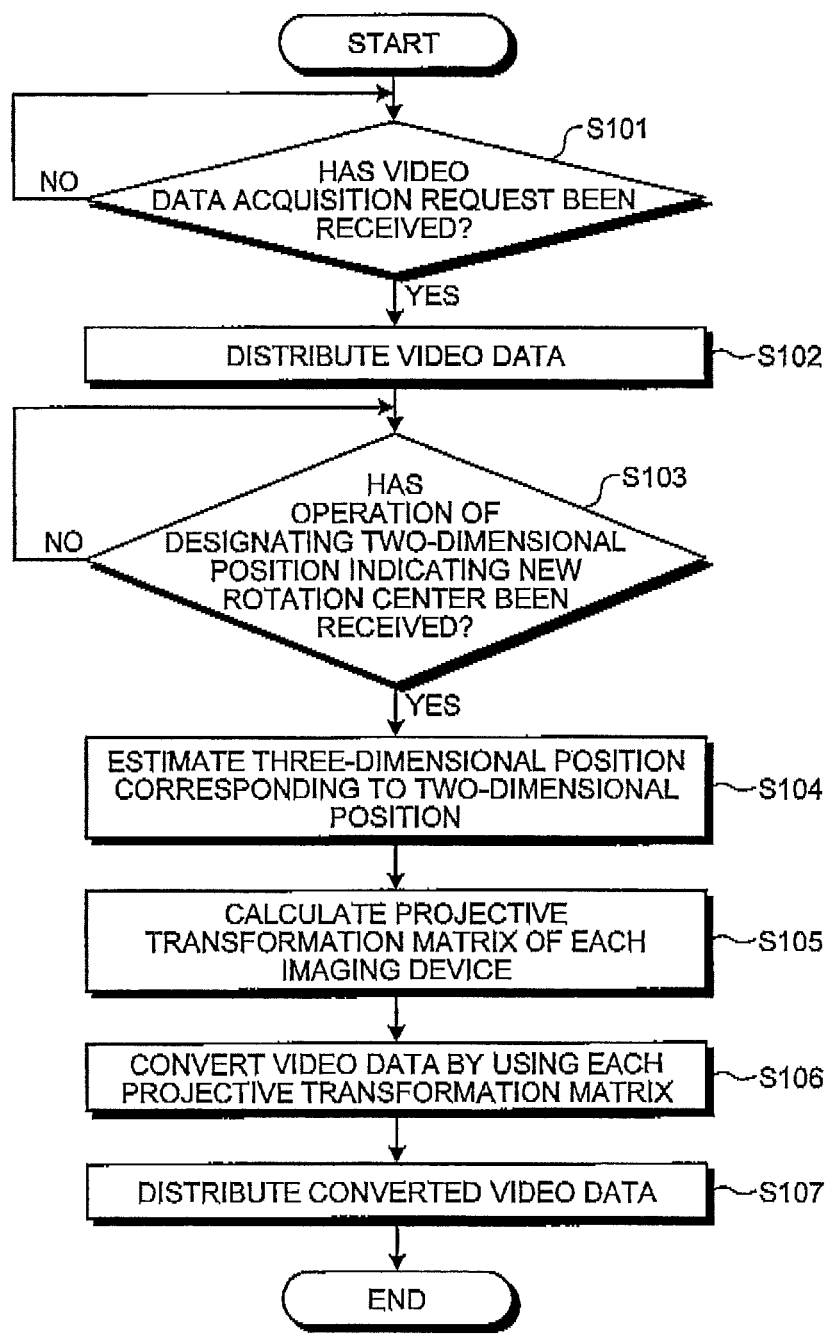
FIG. 9 is a flowchart illustrating the flow of the image processing performed by the image processing apparatus according to the embodiment.

The flow of image processing performed by the image processing apparatus 100 according to the embodiment will be described with reference to FIG. 9. FIG. 9 is a flowchart illustrating the flow of the image processing performed by the image processing apparatus 100 according to the embodiment. In the following, it is assumed that the image storage unit 122 stores therein frames that are generated by the imaging devices C11 to C16 before Conversion and also stores therein frames that are converted by the conversion unit 134 and that correspond to after conversion #1.

As illustrated in FIG. 9, the output unit 131 of the image processing apparatus 100 determines whether a video data acquisition request has been received from the terminal device 10 (Step S101). If the video data acquisition request has not been received (Step S101; No), the output unit 131 waits until the video data acquisition request has been received. In contrast, if the video data acquisition request has been received (Step S101; Yes), the output unit 131 distributes video data corresponding to after conversion #1 stored in the image storage unit 122 to the terminal device 10 (Step S102).

Subsequently, the accepting unit 132 of the image processing apparatus 100 determines whether operation of designating a two-dimensional position indicating a new rotation center with respect to an arbitrary frame contained in the distributed video data has been accepted from the terminal device 10 (Step S103). If the operation of designating the two-dimensional position has not been accepted (Step S103; No), the accepting unit 132 waits until the designation operation has been accepted.

In contrast, if the operation of designating the two-dimensional position has been accepted (Step S103; Yes), the accepting unit 132 outputs the accepted information to the estimation unit 133. For example, the accepting unit 132 accepts, from the terminal device 10, information for identifying the frame on which the user operation has been performed and the designated two-dimensional position, and outputs, to the estimation unit 133, the accepted pieces of the information.

Subsequently, the estimation unit 133 estimates a three-dimensional position in the target object corresponding to the two-dimensional position by using the information on the frame and the two-dimensional position indicating the new rotation center, which are accepted by the accepting unit 132 (Step S104). For example, the estimation unit 133 estimates the three-dimensional position serving as the new rotation center by using a technique such as a multi-baseline stereo method or triangulation.

Subsequently, the conversion unit 134 calculates the projective transformation matrixes $H_1$ to $H_6$ corresponding to the imaging devices C11 to C16 by using the camera parameters of the respective imaging devices stored in the parameter storage unit 121, the two-dimensional position accepted by the accepting unit 132, and the three-dimensional position estimated by the estimation unit 133 (Step S105). The conversion unit 134 converts the video data corresponding to the "after conversion #1" among the pieces of the video data stored in the image storage unit 122 by using the projective transformation matrixes $H_1$ to $H_6$ (Step S106). At this time, the conversion unit 134 stores the converted video data in the "after conversion #2" in the image storage unit 122.

Thereafter, the output unit 131 distributes the video data converted by the conversion unit 134 to the terminal device 10 that has transmitted the acquisition request at Step S101 (Step S107).

5. Modification

The above described image processing apparatus 100 according to the embodiment may be embodied in various different forms other than the above described embodiment. Therefore, other embodiments of the above described image processing apparatus 100 will be described below.

5-1. Enlargement Operation/Reduction Operation

Figure 6:
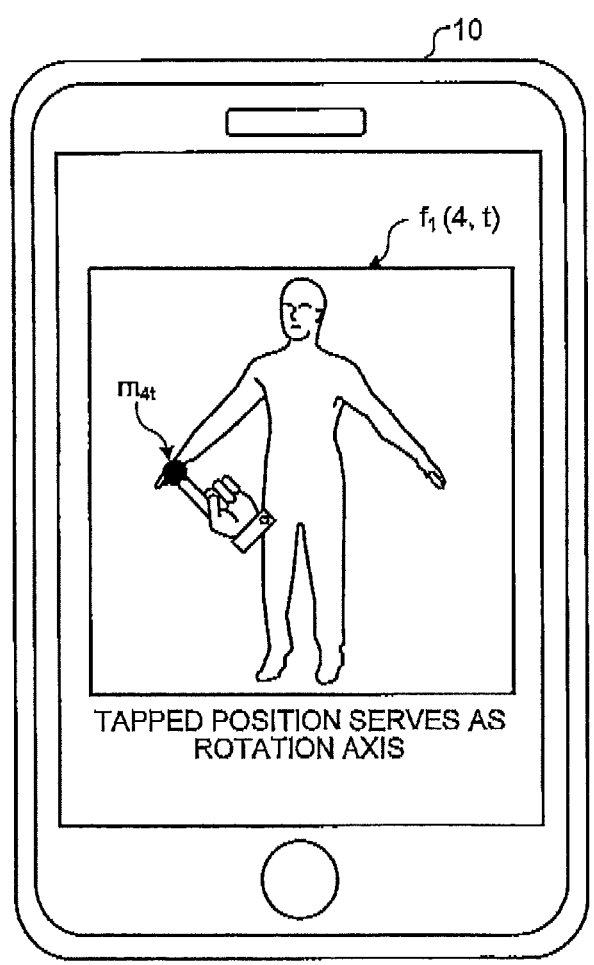
FIG. 6 is a diagram illustrating an example of a process performed by an accepting unit according to the embodiment.

In the above described embodiment, as in the example in FIG. 6, an example is described in which the operation of designating a two-dimensional position indicating a new rotation center is accepted with respect to an arbitrary frame. However, the operation of designating the new rotation center is not limited to the above example. For example, upon accepting enlargement operation or reduction operation on video being displayed, the terminal device 10 may accept, as the two-dimensional position indicating the new rotation center, a center position (or the position of the center of gravity, the same applies to below) of a target region of the enlargement operation or the reduction operation.

Figure 10:
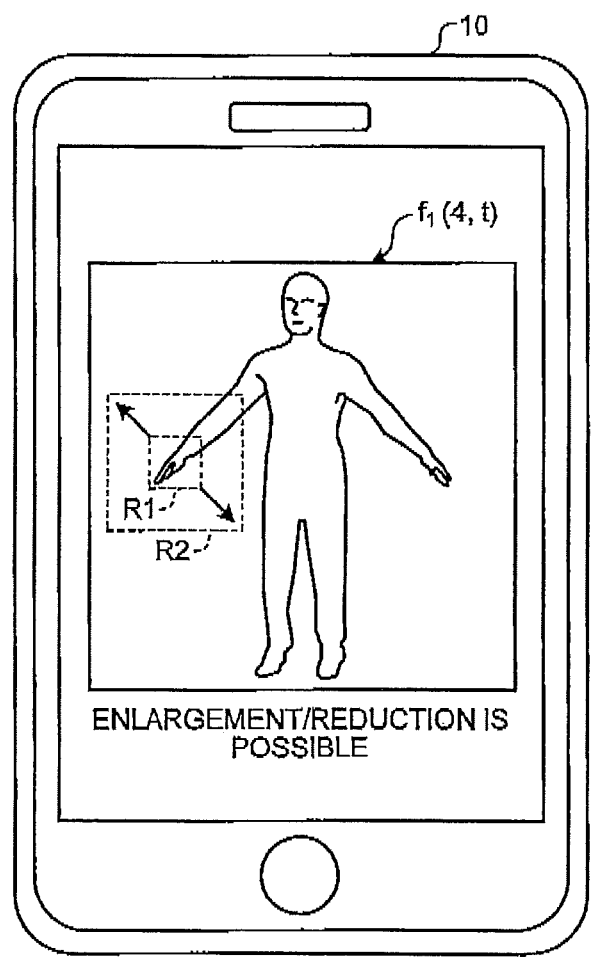
FIG. 10 is a diagram illustrating an example of operation of designating a rotation center according to a modification.

An example of the enlargement operation will be described below with reference to FIG. 10. FIG. 10 is a diagram illustrating an example of operation of designating a rotation center according to a modification. In the example in FIG. 10, the terminal device 10 accepts operation of enlarging a region R1 to a region R2 in the frame $f_1(4, t)$ while the frame $f_1(4, t)$ is being displayed. For example, the terminal device 10 accepts pinch-out operation from a user, in which the user designates opposite vertices of the region R1 by two fingers and then spreads the fingers to opposite vertices of the region R2. In this case, the terminal device 10 transmits, to the image processing apparatus 100, information for identifying the frame $f_1(4, t)$ and a two-dimensional position indicating the center of the region R2 serving as a target region of the enlargement operation. Namely, in the example in FIG. 10, the accepting unit 132 of the image processing apparatus 100 accepts the center position of the region R2 subjected to the enlargement operation as the two-dimensional position indicating the new rotation center.

The subsequent frame conversion process performed by the image processing apparatus 100 is the same as that of the above described first embodiment. Namely, the estimation unit 133 estimates a three-dimensional position corresponding to the center position of the region R2. The conversion unit 134 converts all of the frames stored in the "after conversion #1" in the image storage unit 122 into frames by using the center position of the region R2 as the rotation center. For example, it is assumed that the three-dimensional position corresponding to the center position of the region R2 is the three-dimensional position D2 illustrated in FIG. 3A. In this case, the conversion unit 134 converts each of the frames corresponding to the time t illustrated in FIG. 2B into each of the frames illustrated in FIG. 3B as described above. Furthermore, the conversion unit 134 converts all of frames corresponding to times other than the time t into frames by using the center position of the region R2 as the rotation center.

The output unit 131 distributes the video data formed of the frames converted by the conversion unit 134 to the terminal device 10. In this case, the terminal device 10 displays a portion corresponding to the region R2 of each of the frames distributed by the image processing apparatus 100 in the entire screen in an enlarged manner. FIG. 11 illustrates an example of an enlarged image displayed by the terminal device 10 according to the embodiment. In FIG. 11, an example is illustrated in which the terminal device 10 displays the frames $f_2(1, t)$, $f_2(2, t)$, $f_2(3, t)$, $f_2(4, t)$, $f_2(5, t)$, and $f_2(6, t)$ corresponding to the time t in an enlarged manner. As illustrated in FIG. 11, when the frame $f_2(1, t)$ converted as in the example in FIG. 3B is to be displayed in an enlarged manner, the terminal device 10 displays a region $f_2(1, t)'$ corresponding to the region R2 of the frame $f_2(1, t)$. Similarly, the terminal device 10 displays a region $f_2(2, t)'$ corresponding to the region R2 of the frame $f_2(2, t)$, and displays a region $f_2(6, t)'$ corresponding to the region R2 of the frame $f_2(6, t)$.

As described above, the image processing apparatus 100 generates video data by using the center position of the region R2 subjected to the enlargement operation as the new rotation center, so that it becomes possible to display a point desired to be watched by a user. For example, in FIG. 10, a user performs operation of displaying the right hand of the object P in an enlarged manner with respect to the frame $f_1(4, t)$ generated by the imaging device C14. In this example, if the region R2 of each of the frames in the "after conversion #1" is displayed in an enlarged manner without changing the rotation center, the right hand of the object P as a point to be watched by the user may not be displayed.

This will be described using the example in FIG. 2B. Even if the right hand of the object P is drawn in a certain region of the frame $f_1(4, t)$, the right hand of the object P may not always be drawn in regions of the frames $f_1(1, t)$, $f_1(2, t)$, $f_3(3, t)$, $f_1(5, t)$, and $f_1(6, t)$ corresponding to the certain region. However, the image processing apparatus 100 according to the embodiment converts each of the frames illustrated in FIG. 2B into each of the frames illustrated in FIG. 3B upon accepting the enlargement operation illustrated in FIG. 10. Therefore, the terminal device 10 displays regions of the respective frames illustrated in FIG. 3B corresponding to the region R2 illustrated in FIG. 10 in an enlarged manner, so that it becomes possible to display video in which the right hand of the object P as a point to be watched by the user is drawn as in the example illustrated in FIG. 11.

In the above description, an example is described in which the center position of the region R2 subjected to the enlargement operation is used as the new rotation center. However, the image processing apparatus 100 may use, as the new rotation center, the center position of the region R1 that is not subjected to the enlargement operation.

Furthermore, in the above described example, the enlargement operation is mainly explained. However, when the reduction operation is performed, the image processing apparatus 100 performs a conversion process on each of the frames by using, as a new rotation center, the center position or the position of the center of gravity of a target region to be subjected to the reduction operation.

5-2. Automatic Change in Rotation Center

In the above described embodiment, an example is described in which the rotation center of video is changed according to user operation. However, not being limited to this example, the image processing apparatus 100 may display, on the terminal device 10, video in which the rotation center is automatically changed. For example, the image processing apparatus 100 analyzes each of frames stored in the "after conversion #1" in the image storage unit 122, and extracts multiple objects drawn in the frames. Subsequently, the image processing apparatus 100 performs a frame conversion process for each of the extracted objects by using a region of each of the objects as a new rotation center, and distributes, to the terminal device 10, video data in which the rotation center is changed for each of the objects.

For example, it is assumed that the image processing apparatus 100 extracts a person X1 and a person X2 as objects drawn in each of the frames. In this case, the image processing apparatus 100 generates video data Y1 by using the person X1 as a rotation center, generates video data Y2 by using the person X2 as a rotation center, and distributes the video data Y1 and the video data Y2 to the terminal device 10. The image processing apparatus 100 first displays the video data Y1 and subsequently displays the video data Y2 on the terminal device 10. As described above, the image processing apparatus 100 may automatically change the rotation center. By doing so, the image processing apparatus 100 can express attractive video.

5-3. Number of Imaging Devices

In the above described embodiment, an example is described in which the multiple imaging devices C11 to C16 generate pieces of video data. However, the above described pieces of the video data may be generated by a single imaging device. For example, it may be possible to cause a single imaging device to capture images of the object P while moving around the object P and generate pieces of video data with different viewpoint positions. The image processing apparatus 100 may perform the above described conversion process on the pieces of the video data generated by the single imaging device as described above and generate pieces of video data by using an arbitrary position as the rotation center.

5-4. System Configuration

Of the processes described in the embodiments, all or part of a process described as being performed automatically may also be performed manually. Alternatively, all or part of a process described as being performed manually may also be performed automatically by known methods. In addition, processing procedures, specific names, and information including various types of data and parameters illustrated in the above described document and drawings may arbitrarily be changed unless otherwise specified.

For example, in the above described embodiment, an example is described in which the rotation center is located in the center of each frame. However, the rotation center need not be located in the center of each frame. Furthermore, the position serving as the rotation center in the frame may differ for each imaging device.

Moreover, various types of information illustrated in, for example, FIG. 5 or the like are not limited to the information illustrated in the drawings. Furthermore, the objet illustrated in, for example, FIG. 2A, FIG. 2B, FIG. 3A, FIG. 3B, FIG. 6, FIG. 7, FIG. 8, FIG. 10, FIG. 11, or the like is a schematic example, and is not limited to those illustrated in the drawings.

The components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

For example, in the above described embodiment, an example is described in which the image processing apparatus 100 is a server device. However, the image processing apparatus 100 may be an information processing apparatus that runs as stand-alone. In this case, the image processing apparatus 100 includes an input unit that accepts various types of operation from a user and a display unit that displays various types of information. Furthermore, for example, the above described process performed by the image processing apparatus 100 may be performed by the terminal device 10. In this case, the terminal device 10 includes the control unit 130 illustrated in FIG. 4. In this case, the terminal device 10 may also include the parameter storage unit 121 or the image storage unit 122, and may appropriately acquire various types of data stored in the parameter storage unit 121 and the image storage unit 122 from the image processing apparatus 100.

6. Advantageous Effects

As described above, the image processing apparatus 100 according to the embodiment includes the image storage unit 122, the conversion unit 134, and the output unit 131. The image storage unit 122 stores therein images (for example, frames forming video data) generated by causing the multiple imaging devices C11 to C16 arranged in different positions to capture images of a target object (for example, the object P). The conversion unit 134 converts each of images stored in the image storage unit 122 into each of images to be imaged by imaging devices when the imaging devices are arranged such that the optical axes pass through a dynamically set position in the target object. The output unit 131 outputs the images converted by the conversion unit 134.

Therefore, the image processing apparatus 100 according to the embodiment generates frames in which an arbitrary position is used as the rotation center, from the frames generated by the imaging devices C11 to C16. Accordingly, it becomes possible to display video, in which an arbitrary position is used as the rotation center, on the terminal device 10 without performing imaging a number of times while changing the rotation center.

Furthermore, the image processing apparatus 100 according to the embodiment includes the accepting unit 132 and the estimation unit 133. The accepting unit 132 accepts operation of designating a position in an arbitrary image stored in the image storage unit 122. The estimation unit 133 estimates the position of a target object corresponding to the position accepted by the accepting unit 132. The conversion unit 134 performs a conversion process by using the position estimated by the estimation unit 133 as a dynamically set rotation center.

Therefore, the image processing apparatus 100 according to the embodiment can change the rotation center of video according to user operation. As a result, the image processing apparatus 100 according to the embodiment can improve the user satisfaction.

Furthermore, the accepting unit 132 according to the embodiment accepts the enlargement operation of enlarging a region in an arbitrary image. The estimation unit 133 estimates a position of a target object corresponding to the center position of a target region of the enlargement operation accepted by the accepting unit 132. In this case, the conversion unit 134 performs a conversion process by using the position estimated by the estimation unit 133 as a dynamically set rotation center.

Therefore, the image processing apparatus 100 according to the embodiment can display, on the terminal device 10, video in which the region subjected to the enlargement operation by the user is used as the rotation center. Furthermore, even when the enlargement operation is performed, the image processing apparatus 100 can display a point desired to be watched by the user in the enlarged video.

Moreover, the accepting unit 132 according to the embodiment accepts the reduction operation of reducing a region in an arbitrary image. The estimation unit 133 estimates a position of a target object corresponding to the center position of a target region of the reduction process accepted by the accepting unit 132. In this case, the conversion unit 134 performs a conversion process by using the position estimated by the estimation unit 133 as a dynamically set rotation center.

Therefore, the image processing apparatus 100 according to the embodiment can display, on the terminal device 10, video in which the region subjected to the reduction process by the user is used as the rotation center.

While the embodiments have been explained in detail above based on the drawings, the embodiments are described by way of example, and the present invention may be embodied in various other forms with various changes or modifications based on knowledge of person skilled in the art, in addition to the embodiments described in this specification.

The above described image processing apparatus 100 may be implemented by multiple server computers. The structure may be changed flexibly depending on functions. The functions may be implemented by calling an external platform or the like by an application programming interface (API) or network computing.

Furthermore, "a unit" recited in the claims may be replaced with "a section, a module, or a means" or "a circuit". For example, the conversion unit may be replaced with a conversion means or a conversion circuit.

According to an embodiment of the image processing apparatus, the image processing method, and the image processing program, it becomes possible to display video by using an arbitrary position as a rotation center.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a memory configured to store therein multiple images of a target object with different viewpoint positions, each of the images having an optical axis that passes through a common first three-dimensional position of the object; and
   a processor programmed to:
      accept an enlargement operation or a reduction operation on a target region in any of the stored images, the target object displayed in the one of the stored images having a first central rotation axis orthogonal to the optical axis, the first central rotation axis passing through the common first three-dimensional position;
      estimate a second three-dimensional position of the target object corresponding to a center position of the target region of the accepted enlargement operation or the accepted reduction operation, the estimated second three-dimensional position being different from the first three-dimensional position, a portion of the target object displayed in the display region having a second central rotation axis that passes through the second three-dimensional position of the target object;
      respectively convert each of the stored images into each of images that appear to have been imaged by imaging devices that are arranged such that respective optical axes of the converted images pass through the estimated second three-dimensional position, the respective converted images to be displayed sequentially such that the target object displayed in the target region appears to rotate around the second central rotation axis at the second three-dimensional position of the target object; and
      output the converted images such that the output converted images are to display the target object on a display in a manner in which the target object appears to rotate around the second central rotation axis at the estimated second three-dimensional position.

2. The image processing apparatus according to claim 1, wherein the processor is programmed to:
   accept an input of the two-dimensional position based on any one of the stored images;
   estimate a position of the target object corresponding to the input two-dimensional position; and
   perform a conversion process by using the estimated position as the estimated second three-dimensional position.

3. The image processing apparatus according to claim 2, wherein the processor is programmed to:
   accept the enlargement operation of enlarging a target region in any one of the stored images; and
   set the estimated center position as the estimated second three-dimensional position.

4. The image processing apparatus according to claim 2, wherein the processor is programmed to:

accept the reduction operation of reducing a target region in the any of the images; and set the estimated center position as the estimated second three-dimensional position.

5. The image processing apparatus according to claim 2, wherein the processor is programmed to:

perform the conversion process by using a projective transformation matrix that is calculated based on the accepted enlargement operation or reduction operation and the estimated second three-dimensional position.

6. The image processing apparatus according to claim 1, wherein the processor is programmed to:

perform a conversion process, for each of the target objects contained in each of the stored images by using a region of each of the target objects as the accepted enlargement operation or reduction operation.

7. An image processing method implemented by an image processing apparatus, the image processing method comprising:

accessing a memory storing therein multiple images of a target object with different viewpoint positions, each of the images having an optical axis that passes through a common point in space;

accepting an enlargement operation or a reduction operation on a target region in any of the stored images, the target object displayed in the one of the stored images having a first central rotation axis orthogonal to the optical axis, the first central rotation axis passing through the common first three-dimensional position;

estimating a second three-dimensional position of the target object corresponding to a center position of the target region of the accepted enlargement operation or the accepted reduction operation, the estimated second three-dimensional position being different from the first three-dimensional position, a portion of the target object displayed in the display region having a second central rotation axis that passes through the second three-dimensional position of the target object;

respectively converting each of the images into each of images that appear to have been imaged by imaging devices that are arranged such that respective optical axes of the converted images pass through the estimated second three-dimensional position, the respective converted images to be displayed sequentially such that the target object displayed in the target region appears to rotate around the second central rotation axis at the second three-dimensional position of the target object; and outputting the converted images such that the output converted images are to display the target object on a display in a manner in which the target object appears to rotate around the second central rotation axis at the estimated second three-dimensional position.

8. A non-transitory computer-readable storage medium with an executable program stored thereon, the program causing a computer to perform:

accessing a memory storing therein multiple images of a target object with different viewpoint positions, each of the images having an optical axis that passes through a common first three-dimensional position of the object;

accepting an enlargement operation or a reduction operation on a target region in any of the stored images, the target object displayed in the one of the stored images having a first central rotation axis orthogonal to the optical axis, the first central rotation axis passing through the common first three-dimensional position;

estimating a second three-dimensional position of the target object corresponding to a center position of the target region of the accepted enlargement operation or the accepted reduction operation, the estimated second three-dimensional position being different from the first three-dimensional position, a portion of the target object displayed in the display region having a second central rotation axis that passes through the second three-dimensional position of the target object;

respectively converting each of the images into each of images that appear to have been imaged by imaging devices that are arranged such that respective optical axes of the converted images pass through the estimated second three-dimensional position, the respective converted images to be displayed sequentially such that the target object displayed in the target region appears to rotate around the second central rotation axis at the second three-dimensional position of the target object; and outputting the converted images such that the output converted images are to display the target object on a display in a manner in which the target object appears to rotate around the second central rotation axis at the estimated second three-dimensional position.

* * * * *